D. Robinson,
Water Gate,

Nº 15,256. Patented July 1, 1856.

UNITED STATES PATENT OFFICE.

DANL. ROBINSON, OF LENOXVILLE, PENNSYLVANIA.

BALANCE-GATE FOR FLUMES IN WATER-POWER.

Specification of Letters Patent No. 15,256, dated July 1, 1856.

*To all whom it may concern:*

Be it known that I, DANIEL ROBINSON, of Lenoxville, in the county of Susquehanna and State of Pennsylvania, have invented a new and useful Improvement in Sliding Gates for the Penstocks and Flumes of Water-Mills; and I do hereby declare that the following is a full, clear, and exact description of the same, reference being had to the annexed drawings, making a part of this specification, in which—

Figure 2:
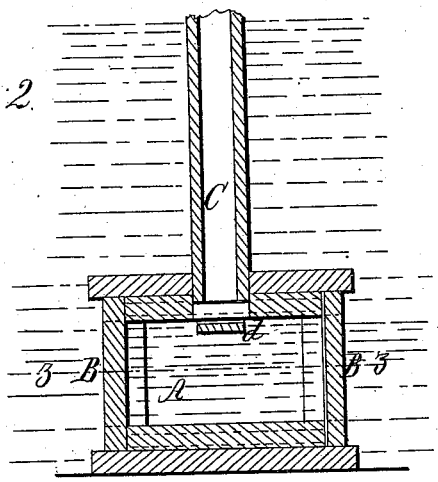
Figure 1:
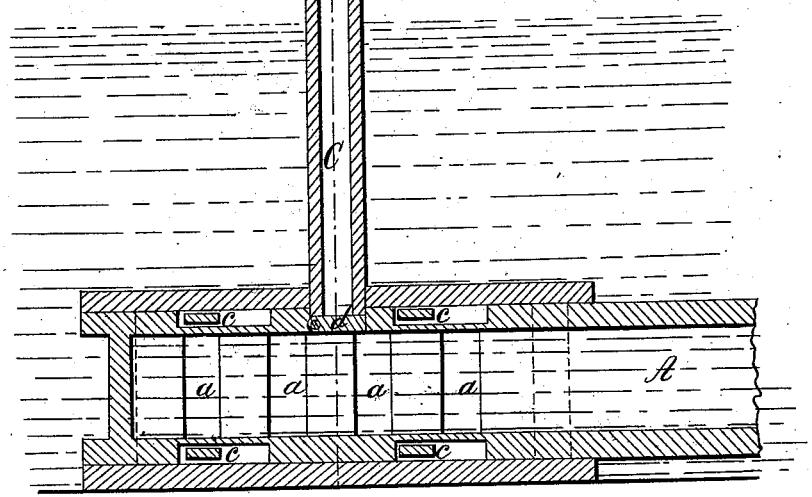
Figure 3:
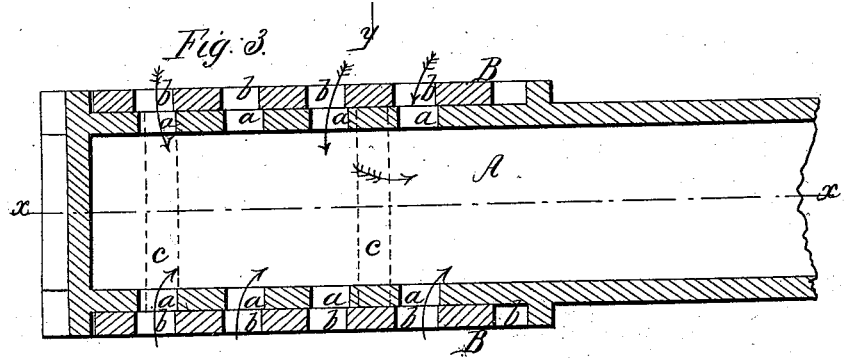

Figure 1, is a longitudinal vertical section of a penstock with my improvement applied to it, $(x)$, $(x)$, Fig. 3, shows the plane of section. Fig. 2, is a transverse vertical section of the same, $(y)$, $(y)$, Fig. 1, showing the plane of section. Fig. 3, is a horizontal section of the same, $(z)$, $(z)$, Fig. 2, showing the plane of section.

Similar letters of reference indicate corresponding parts in the several figures.

My invention consists in having a gate at each side of the penstock, and having the two gates connected by cross bars, so that the pressure of the water on one gate will be neutralized by the pressure on the other.

The penstock is provided with a tube and valve arranged, as will be presently shown and described, to prevent the penstock from being ruptured or broken by the sudden force or pressure of the water when entering it.

To enable those skilled in the art, to fully understand and construct my invention, I will proceed to describe it.

A, represents a penstock, or portion of a flume, which is placed within a pond or reservoir of water. The sides of the penstock have openings, $(a)$, made through them, said openings being of rectangular form, and considerably higher than they are broad, as shown in Fig. 1. Any proper number of openings may be made in the sides of the penstock.

To each side of the penstock there is attached a gate B. These gates have openings, $(b)$, made through them, said openings corresponding in size to the openings, $(a)$, in the sides of the penstock. The gates B, are allowed to slide at the sides of the penstock, so that the openings, $(b)$, may be brought in line with the openings, $(a)$, or be thrown out of line with them. When the openings are out of line with each other, the gates are closed, and when they are in line with each other, the gates are open. The two gates B, B, are connected by cross bars, $(c)$, at their upper and lower ends, as shown in Fig. 1, and by dotted lines in Fig. 2. The cross bars cause the two gates to move or slide simultaneously, and they also prevent friction as the gates are operated by the pressure of the water against them.

The water is let into the penstock or flume when the gates are open, through the openings, $(a)$, $(b)$, as shown by the arrows in Fig. 3, and when the gates are closed, the openings $(b)$ in the gates will be opposite the spaces between the openings, $(a)$, in the sides of the penstock. If the gates were not connected by the bars, $(c)$, they would be subjected to considerable pressure by the head of water, and consequently considerable power would be required to operate them, but as they are connected by the bars, $(c)$, the pressure exerted against one gate is neutralized or counteracted by the pressure on the other gate, and the gates are consequently balanced, and may be operated, or opened and closed with the greatest facility, and with but little power.

C, represents a vertical tube, which is inserted in the upper part of the penstock. This tube extends upward above the surface of the water, and has a valve, $(d)$, at its lower end, said valve opening downward. This valve is closed by the water when the gates are opened, and the water enters the penstock or flume, and when the gates are closed, and the water passes out of the penstock or flume, the air will rush down the tube, open the valve, and enter the penstock, which, being thus supplied with air, is prevented from being ruptured or broken by the water suddenly rushing into it, when the gates are opened.

The valve prevents the water from ascending into the tube, which would otherwise be the case were no valve employed, and the tube would be liable to be broken or bursted, in consequence of the water freezing within it in winter.

A balance water gate formed by having two disks placed upon a shaft, was formerly patented by me. The principle of the gate patented is the same as that herein described, but the construction of the one herein described, is more simple, may be made by any mechanic, and will operate equally as well as the one patented.

Having thus described my invention, what I claim as new, and desire to secure by Letters Patent, is,

1. The two sliding gates B, B, placed at opposite sides of the penstock A, and connected by bars, (c), substantially as shown, for the purpose specified.

2. I further claim the tube C, and valve, (d), applied to the penstock, as shown, for the purpose specified.

DANIEL ROBINSON.

Witnesses:
Isaac M. Doud,
John D. Farnum.